United States Patent
Kuperman et al.

(10) Patent No.: US 10,735,382 B2
(45) Date of Patent: Aug. 4, 2020

(54) DETECTING HUMAN ACTIVITY TO MITIGATE ATTACKS ON A HOST

(71) Applicant: Zenedge, Inc., Los Angeles, CA (US)

(72) Inventors: Leon Kuperman, Tarzana, CA (US); Fausto Lendeborg, Miami, FL (US); David Allen McKinney, Port Saint Lucie, FL (US); Jose Enrique Hernandez, North Miami, FL (US)

(73) Assignee: Zenedge, Inc., Aventura, FL (US)

( * ) Notice: Subject to any disclaimer, the term of this patent is extended or adjusted under 35 U.S.C. 154(b) by 151 days.

(21) Appl. No.: 15/418,527

(22) Filed: Jan. 27, 2017

(65) Prior Publication Data

US 2017/0223049 A1  Aug. 3, 2017

Related U.S. Application Data

(60) Provisional application No. 62/289,182, filed on Jan. 29, 2016, provisional application No. 62/289,183, filed on Jan. 29, 2016.

(51) Int. Cl.
*H04L 29/06* (2006.01)

(52) U.S. Cl.
CPC ...... *H04L 63/0281* (2013.01); *H04L 63/1416* (2013.01); *H04L 63/1425* (2013.01); *H04L 63/1458* (2013.01); *H04L 63/1466* (2013.01); *H04L 2463/144* (2013.01)

(58) Field of Classification Search
CPC ............. H04L 63/1466; H04L 63/1416; H04L 63/1425; H04L 63/0281; H04L 63/1458
See application file for complete search history.

(56) References Cited

U.S. PATENT DOCUMENTS

| | | | |
|---|---|---|---|
| 8,850,580 B2 | 9/2014 | Prince et al. | |
| 9,112,900 B1 * | 8/2015 | Peacock | G06F 17/2247 |
| 9,473,530 B2 | 10/2016 | Bhogavilli et al. | |
| 9,628,509 B2 | 4/2017 | Holloway et al. | |
| 9,661,020 B2 | 5/2017 | Holloway et al. | |
| 9,825,928 B2 | 11/2017 | Lelcuk et al. | |
| 2010/0281008 A1 * | 11/2010 | Braunwarth | G06Q 30/00 707/705 |
| 2011/0022704 A1 * | 1/2011 | Duan | G06F 16/957 709/224 |

(Continued)

*Primary Examiner* — Eleni A Shiferaw
*Assistant Examiner* — Bassam A Noaman
(74) *Attorney, Agent, or Firm* — Kraguljac Law Group, LLC

(57) ABSTRACT

A system detects human activity through browser canvas events to mitigate the effects of an attack on a host, such as an application layer (layer 7) DDoS attack. A proxy, such as a HTTP/HTTPS "HTTP(S)" proxy server, configured to handle network traffic between a host and clients challenges clients engaging the host. The proxy challenges the clients by injecting code having a beacon and a shared encryption key into the content received from the host prior to transmission of the client. The code, when executed by the client, is configured to monitor user interactions (or lack thereof) with the content at the client in order to determine whether there is human activity at the client. The proxy receives and analyzes the information about interactions (or lack thereof) to determine whether a client is malicious (e.g., non-human activity) or non-malicious (e.g., human activity).

15 Claims, 7 Drawing Sheets

(56) References Cited

U.S. PATENT DOCUMENTS

| | | | |
|---|---|---|---|
| 2012/0036022 A1* | 2/2012 | Dharmaji | G06Q 30/0241 |
| | | | 705/14.69 |
| 2015/0319185 A1* | 11/2015 | Kirti | H04L 63/1416 |
| | | | 726/23 |
| 2015/0339479 A1* | 11/2015 | Wang | G06F 21/556 |
| | | | 726/22 |
| 2016/0197945 A1* | 7/2016 | Call | H04L 63/1425 |
| | | | 726/23 |
| 2017/0063923 A1* | 3/2017 | Yang | H04L 63/1483 |
| 2017/0339172 A1* | 11/2017 | Mahadevia | G06F 21/554 |

* cited by examiner

DETECTING HUMAN ACTIVITY TO MITIGATE ATTACKS ON A HOST

CROSS REFERENCE TO RELATED APPLICATIONS

This application claims the benefit of U.S. Provisional Application No. 62/289,182, filed Jan. 29, 2016, and U.S. Provisional Application No. 62/289,183, filed Jan. 29, 2016, both of which are incorporated by reference herein in their entirety.

TECHNICAL FIELD

The disclosure generally relates to improving user experience when accessing a host with a client, and more specifically, to detecting human activity through browser canvas events to distinguish between human and non-human actors for mitigating distributed denial of service (DDoS) attack on the host.

BACKGROUND

Internet enabled clients, such as smart phones, personal computers, tablets, gaming systems and the like have become prevalent in recent years. Given the proliferation of Internet enabled clients and far-reaching Internet access, more and more users access online content hosted by servers. The vast majority of users access online content from hosts for legitimate reasons. However, there are illegitimate users who try to take down the hosts of online content with malicious clients, whether to simply deny services to other users or for more nefarious purposes. In many instances, the illegitimate users infect the non-malicious clients of other users with malware such that an increasing number of malicious clients engage in illegitimate activities from disparate locations.

One method of attacking a host is a Distributed Denial of Service (DDoS) attack. A commonly employed type of DDoS attack is an application layer DDoS attack. This is a dangerous DDoS attack type targeting the application layer (layer 7) of a host in the Open Systems Interconnection (OSI) model. An example application layer DDoS attack may maliciously over-exercise functions or features at the application layer of a host with the intention to disable those functions or features. The malicious over-exercising of functions or features of the host decreases the amount of processing resources the host can make available for legitimate user activities. Over time this causes all processing to grind to a virtual halt. By way of example, if a host receives, on average, 100 requests per second and can handle a maximum of 1,000 requests per second, a DDoS attack generating 10,000+ malicious requests per second prevents host processing resources from effectively addressing those requests due to overwhelming demand. Example host computing resources that effectively are drained causing processing activity to grind to towards a halt during an application layer DDoS attack. Hosting computing resources affected may include, for example, compute resources for dynamically generated web content, database resources, search index resources, ecommerce components, and/or application programming interface (API) endpoints.

Current techniques for mitigating the effects of DDoS attacks on legitimate user access to the host generate a high number of false positives when they attempt to distinguish between malicious and non-malicious clients at the time of attack. False positives are instances where a non-malicious client is falsely categorized or identified as a malicious client. As an example, under some current techniques, all clients attempting to access a particular feature of the host that is under attack may be categorized as malicious (e.g., denied access to the host) during the attack period. While this technique potentially prevents clients accessing other features of the host from being affected by the attack, malicious and non-malicious clients alike are denied access to attacked features during the attack period. As a result, selectively attacking features of the host such as a checkout feature of an ecommerce site can effectively shut down legitimate user progress through the site. In turn, this causes numerous negative effects, including, for example, negatively impacting user experiences such as response times, reducing commercial transactions through the ecommerce site, and/or discouraging future site access due to negative publicity.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

Figure (FIG. 1 illustrates a block diagram of an example communications environment of an attack on a host, according to one example embodiment.

DETAILED DESCRIPTION

Figure 1:
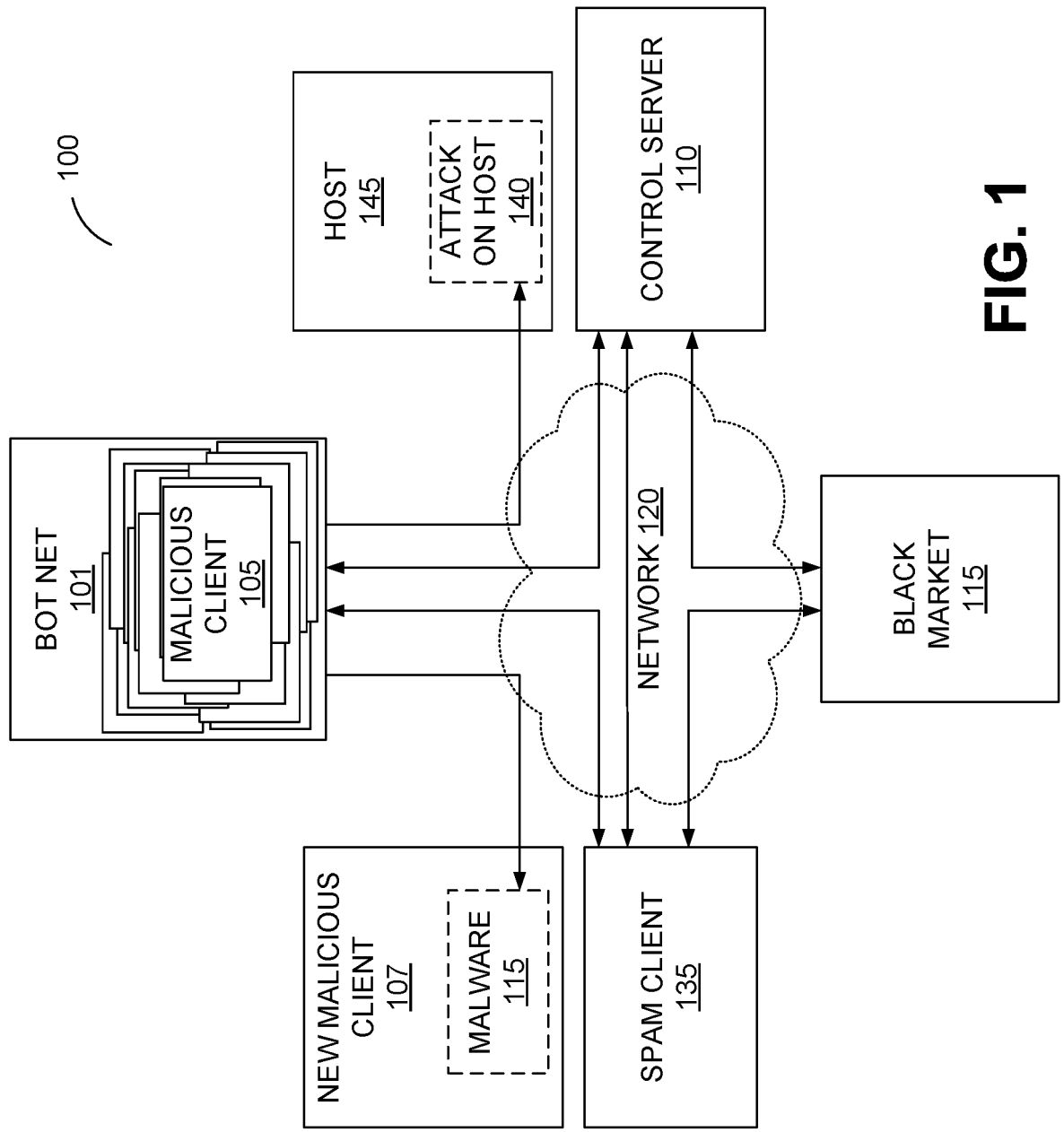

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A system (and method, and computer readable storage medium storing computer program instructions) may be configured for detecting human activity at a client device (or client) through browser canvas events to mitigate the effects of an attack on a host device (or host). An example of an attack may be an application layer (layer 7) DDoS attack. Example embodiments described herein include a proxy, such as a Hypertext Transfer Protocol (HTTP)/HTTPS over Secure Socket Layer/HTTPS) (or HTTP(S)) proxy server, configured to handle network traffic between at least one host and one or more clients. Clients engage the host through the proxy to access application layer features and functionality of the host. For example, the proxy may receive a request from a client for content on the host server. In turn, the proxy transmits the request to the host and receives the content from the host for transmission to the client. The proxy injects code into the content received from the host prior to transmission of the client. The code, when executed by the client, is configured to monitor user interactions (or lack thereof) with the content at the client in order to determine whether there is human activity at the client.

In one embodiment, the proxy injects JavaScript code into the content for transmission to the client. In addition to the configuration of the code to determine whether a human is utilizing the client, the code injected into the content is configured such that application layer functionality and performance is not compromised.

In one embodiment, the code injected into the content and transmitted to the client by the proxy attaches to "canvas" objects when executed by the client. For example, in HTML content transmitted to the client, the code injected by the proxy attaches to HTML canvas objects such as mouse, keyboard and scrolling events over/within the HTML content when displayed at the client (e.g., within a browser of the client where such canvas events are indicative of the presence of human activity). In one example, the injected code when executed at the client side, referred to herein as a Canvas Challenge Function (or CCF), monitors for the presence of one or more canvas events over a period of time, e.g., 1-30 seconds, and records detected canvas events in client memory (e.g., as a canvas event record).

The CCF provides the canvas event record to the proxy for analysis. The CCF may provide the canvas event record to the proxy in a number of ways, for example, through JavaScript, AJAX, beacon return, cookie, or combination therefore and the like. Thus, the canvas event record may be communicated to the proxy in a number of ways including: setting a cookie value, AJAX request, or a beacon request. In turn, the proxy analyzes the canvas event record to determine whether the detected canvas events are indicative of human activity.

Additionally, in some example embodiments, as clients engage the host, the proxy determines an identity of each of the clients engaging the host, referred to herein as a client fingerprint. The client fingerprint provides a relatively stable representation of a client such that the client may be distinguished from other clients engaging the host. In turn, the proxy may build a store of "fingerprints" corresponding to permitted clients having passed the CCF and a store of fingerprints corresponding to denied clients having failed the CCF.

In some embodiments, the CCF may include additional code (e.g., JavaScript) to determine a client fingerprint in addition to recording browser canvas events. The code when executed by the client queries the client for client attributes (e.g., of the client and/or browser). The code for determining the client fingerprint may provide the client attributes to the proxy in a fashion similar to the providing of browser canvas events. In some embodiments, the cookie, AJAX call, and/or beacon request include both canvas event record information and client attribute information. In some embodiments, the canvas event record and/or client attribute information are hashed at the client and the hash(s) thereof are provided to the proxy.

The proxy receives the canvas event record information and/or the client fingerprint information as a means of human/non-human actor identification. In some embodiments, the proxy allows for a configurable number of client requests to occur for retrieval of canvas event records prior to identifying the client as malicious or non-malicious. For example, a system Administrator may set a configuration threshold value for failed requests (a request for which there is no valid canvas event record information). In turn, the proxy services up to the threshold of client requests while monitoring the canvas event record information. Upon reaching the threshold value of client requests without the client passing the CCF, the proxy may identify the client as a malicious client. Once a malicious client (e.g., a bot) is identified, any combination of client fingerprint information (e.g., hash of client attributes, client IP address, etc.) for the malicious client is identified to the denied client store such that the proxy may block future requests from the malicious client.

In some example embodiments, the system (and method, and computer readable storage medium storing computer program instructions) includes one or more routers upstream of the proxy. An upstream router may route traffic between one or more clients and the proxy. Multiple upstream routers may be positioned between the proxy and a client, the most upstream router closest to the client and the least upstream router positioned closest to the proxy, with any number of intervening routers. In some embodiments, the proxy provides client fingerprint information in the denied client store to an upstream router. In turn, the upstream router blocks client requests destined for the host prior to their receipt at the proxy. In some example embodiments, the proxy identifies a most upstream router accessed by a denied client for providing client fingerprint information corresponding to the denied, thus decreasing an amount of illegitimate traffic on one or more networks.

DDoS Attacks

Turning now to Figure (FIG. 1, it illustrates a block diagram of an example communications environment 100 of an attack 140 on a host device 145, such as a DDoS attack targeting the application layer of the host, according to one embodiment. The environment 100 comprises one or more client devices (or client) 107, 105, 135, at least one host device (or host) 145, at least one control server 110, and at least one black market device (or black market) 115, all of which may have the ability to inter-communicate via a network 120.

The network 120 may be a communication network. The network 210 may transmit data between one or more of the clients 107, 105, 135, host 145, control server 110, and black market 115. In one embodiment, the network 120 may be the Internet. While only one network 120 is shown, nefarious entities such as the spam client, control server and black market may use an overlay network (e.g., a darknet) and/or auxiliary network using specific software, non-standard protocols, etc. for at least a portion of their communications. Example embodiments may include many hosts 145, control servers 110, spam clients 135, malicious clients 105, and new malicious clients 107 recently infected with malware 115.

In one example embodiment the network 120 may include wireless network and/or wired network. In one embodiment, the network 120 uses standard communications technologies and/or protocols. Thus, the network 120 may enable communications using, for example, technologies such as Ethernet, 802.11, integrated services digital network (ISDN), digital subscriber line (DSL), asynchronous transfer mode (ATM), etc. Similarly, the networking protocols used on the network 120 can include, for example, the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), Java Script (Java), Asynchronous Java Script (AJAX), the extensible markup language (XML), etc. In addition, all or some of links can be encrypted using conventional encryption technologies such as the secure sockets layer (SSL), Secure HTTP (HTTPS) and/or virtual private networks (VPNs). In another example embodiment, the entities may use custom and/or dedicated data communications technologies instead of, or in addition to, the ones described above. For example, nefarious entities can also utilize a network 120 of dedicated or private communications links that are not necessarily part of the Internet but may overlay and utilize one or more network 120 components. In another example, clients may utilize provided network access points such as by an Internet Service Provider or Cellular Provider (Service Provider) to transmit and receive data over the 120 network. Thus, a service provider may implement and manage a wireless or wired access point and associated infrastructure to provide client devices or users of the client devices access to the network 120 through a paid service.

In one example embodiment, a client, e.g., 105, 107, 135 is a computing device with network capabilities for transmitting and receiving data packets over the network 120. The clients 105, 107, 135 may be wireless enabled mobile computing devices (laptops, netbooks, tablets, smart telephones, etc.) and/or wired and/or wireless home computing devices (e.g., a laptop, personal computer, media computer, etc.) that include applications or frameworks for accessing online data. Example applications for accessing online data include applications such as a web browser, widgets, mobile applications, utilities, etc. that request, send, and/or receive data over the network and may present received data to the user (e.g., as rendered web content, weather forecast, sports scores, etc.).

In addition, example applications may include malware 115 either as a standalone process and/or process infecting the client. The malware 115 may include or utilize an existing application and/or framework of the client to perform illegitimate online activities. For example, malware may include a headless browser framework that may initiate illegitimate requests and/or responses (e.g., for one or more features or functionality of a webpage) to a host 145. In another example, malware 115 may infect a browser and may cause the browser to initiate illegitimate request and/or responses (e.g., for one or more features or functionality of a webpage) to a host 145. In yet another example, malware 115 may infect a widget or application may initiate illegitimate requests and/or responses (e.g., for one or more features or functionality of an application programming interface (API)) to a host 145.

The requests and/or responses from the malware 115 may target a specific feature or functionality of the host 145, such as an application programming interface (API) of the host that communicates information to an application or widget, or a component within online content provided by the host that causes the host to perform a function such as generate a shopping cart, checkout purchases, etc. More generally, the malware 115 causes infected clients 105, 107 to perform actions the users of the clients do not initiate (e.g., engage in illegitimate non-user activities). Oftentimes, the users of the infected clients 105, 107 are unaware of the illegitimate activities of their client devices.

In some example embodiments, an attack on a host 140 may be orchestrated through a bot net 101. In one example embodiment, a bot net 101 may be a collection of computing devices, e.g., malicious clients 105, that are infected with malicious software (e.g., malware 115). The bot net 101 may be controlled by an attacker. Oftentimes the users of the malicious clients 105 are unaware their devices are infected with malware 115 and controllable by an attacker. Malicious clients 105 may infect new malicious clients 107 with the malware 115, which in turn become constituents of the bot net 101. Thus, the bot net 101 expands in size as more and more clients are infected. Bot nets 101 are utilized to commit a variety of cybercrimes such as spamming, infecting new malicious clients 107 with malware 115, and DDoS attacks.

In some example embodiments, a control server 110 may be configured to communicate with the malicious clients 105 infected with malware 115 and constituting the bot net 101 is responsible for orchestrating attacks on hosts 140 such as DDoS attacks as well as other cybercrimes. In some embodiments, the operator of a control server 110 may sell or rent out access to the bot net 101 on a black market 115. An attacker utilizing a spam client 135 may either control a bot net 101 via their control server 110 (e.g., in instances where the attacker purchased the bot net 101 over the black market 115 or constructed the bot net 101 themselves) or rent access to the bot net 101 and control server 110 via the black market 115. In either instance, the spam client 135 may instruct the control server 110 to command the malicious client 105 constituents of the bot net 101 to carry out an attack on the host 140.

An example attack on the host 140 may be a DDoS attack that targets the application layer (layer 7) of the host 145 in the Open Systems Interconnection (OSI) model. Unchecked, the attack 140 may maliciously over-exercise specific functions or features at the application layer of the host 145 with the intention to disable those functions or features for legitimate users. The over-exercising of functions or features drains the host of resources available for legitimate, non-malicious activities. Example host resources drained during an application layer DDoS attack may include compute resources for dynamically generated web content, database resources, search index resources, ecommerce components, and application programming interface (API) endpoints.

In example embodiments described herein, the host 145 may be a computing device (e.g., a server) or collection thereof providing features and functions such as dynamically generated web content, database resources, search index resources, ecommerce components, and application programming interface (API) endpoints to clients over the network 120. As the malware 115 infecting malicious clients 105, 107 affords the control server 110 with some degree of control over client functionality, the control server 110 may be instructed to command the constituent clients 105 of the bot net 101 infected with the malware 115 to engage the host 145 over the network 120. For example, the control server 110 may command malicious clients 105 within the bot net 101 to initiate network requests directed to the host 145 which exercise one or more functions or features of the host available to the clients, thus constituting an attack on the host 140. When the bot net 101 includes a sufficient number of constituent clients 105 simultaneously performing the activity, the attack on the host 140 orchestrated by the control server 110 maliciously over-exercises the specific functions or features of the host 145—thus draining host resources—via the bot net.

Canvas Challenge Function in Mitigating DDoS Attacks

Figure 2:
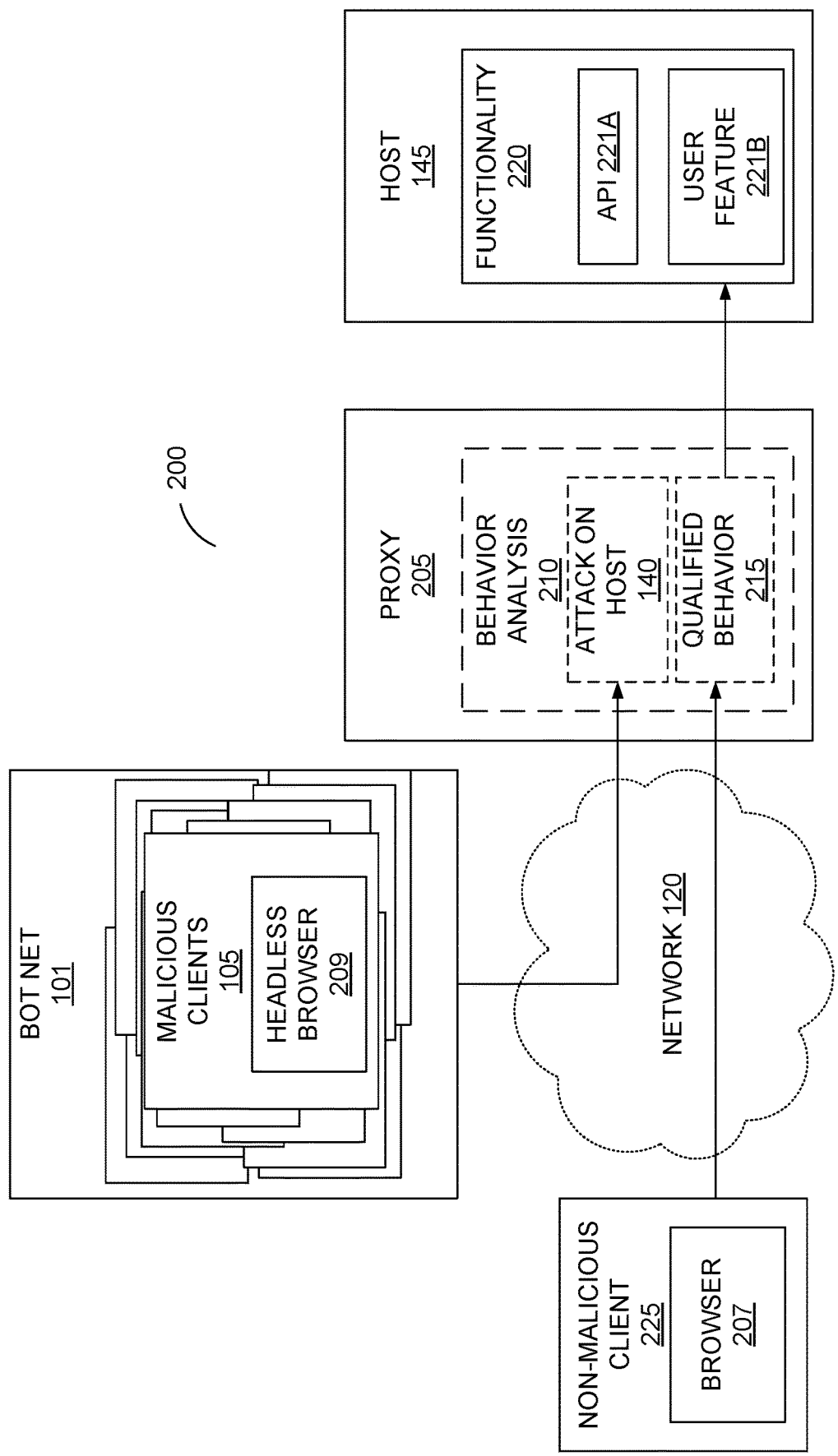
FIG. 2 illustrates a block diagram of an example communications environment including a proxy for mitigating an attack on a host, according to one example embodiment.

Turning now to FIG. 2, it illustrates a block diagram of an example communications environment 200. The example communication environment may include a proxy 205 for mitigating an attack on a host 140, according to one embodiment. The environment 200 may include a bot net 101 of malicious clients 105, a non-malicious client 225, a proxy 205, and a host 145.

In one example embodiment, the proxy 205 is positioned between the host 145 and the network 120, such that communications between clients 105, 225, and the host 145 flow through the proxy 205. In one example embodiment, the proxy 205 is a standalone computing device, such as server device (or server), or collection thereof that handles traffic between the host 145 and the clients 105, 225. Thus, the proxy 205 may be a server, load balancer, or router located logically and/or physically between the clients 105, 225, the network 120, and/or host 145 to monitor and manage the request/response path between the clients and the host. In other example embodiments, the proxy 205 may be incorporated in the host 145. In either instance, the proxy 205 may receive traffic (e.g., client requests and responses) from the clients 105, 225, which may then be passed on to the host 145, and receives traffic (e.g., host 145 requests and responses) from the host 145, which may then be passed on to the clients 105, 225. In one example embodiment, the proxy 205 is a HTTP(S) proxy that handles traffic between the host 145 and clients 105, 225. Thus, the proxy 205 provides client access to the features and functionality 220 of the host 145, including user features 221B such as dynamically generated web content, database resources, search index resources, ecommerce components, and application programming interface 221A endpoints over the network 120, but without exposing the host 145 directly to the clients.

In some example embodiments, the proxy 205 also may service client 105, 225 requests/responses directly and/or request/respond to the clients as part of its operation. As an example, the proxy 205 may perform request and/or response operations separate from the features and functionality of the host 145 in response to a client request or response.

The proxy 205 may perform a behavior analysis 210 responsible for learning about the behavior of clients engaging the functionality 220 of the host 145. For example, the proxy 205 may analyze client behavior to distinguish between the behavior of non-malicious clients 225 and malicious clients 105. In turn, the proxy 205 may determine that a client engaging the host is a non-malicious client 225 exhibiting qualified behavior 215 and should be permitted access to the functionality 220 of the host 145. Alternatively, the proxy 205 may determine that a client engaging the host is a malicious client 105, which may be involved in an attack on the host 140 and thus denied access to the functionality 220 of the host 145.

Traditionally, the proxy 205 attempts to mitigate the effects of resource drainage at the host 145 incurred by application layer DDoS attacks 140 through behavior analysis 210 that attempts to identify malicious client 105 behavior as the attack occurs. That is, at the time of an attack 140, the behavior analysis 210 attempts to separate non-malicious 225 clients from malicious clients 105. For example, the proxy 205 may employ mitigation techniques such as issue HTTP authentication challenges through client browser redirection, track client requests for host functionality 220, provide a CAPTCHA, and retrieve HTTP header signatures (e.g., user-agent, HTTP version, HTTP method, etc.), all of which may implicate malicious clients 105 based on client response, lack thereof, or the information therein which the behavior analysis 210 examines in an attempt to identify the malicious clients and subsequently deny their access to the host 145. For example, the behavior analysis 210 may determine that clients not responding at an HTTP redirect address, continually requesting a host functionality 220 at a rate above a threshold, failing a CAPTCHAs, and/or having inconsistent or incorrect HTTP header signatures are malicious clients 105. In addition, the proxy 205 may maintain a blacklist of IPs associated with known malicious clients identified through threat intelligence.

While implementing a proxy 205 with the above functionality provides a layer of security, several shortcomings exist. Specifically, the above techniques often generate a significant number of false positives that degrade legitimate user experience. A false positive is an instance where a given attack mitigation technique employed by the proxy 205 rejects a valid request from a non-malicious 225 client. In other words, the proxy 205 incorrectly classifies the behavior of a non-malicious client 225 as an attack on the host 140 rather than qualified behavior 215, and denies the client 225 access to the functionality 220 of the host 145. Consequently, the legitimate user of the non-malicious client 225 cannot access the functionality 220 of the host 145 and perceives a poor user experience. Additionally, in many instances, the sheer number of previously unknown malicious clients 105 participating in an orchestrated botnet 101 attack can overwhelm the ability of the proxy 205 to effectively employ the aforementioned mitigation techniques and perform behavior analysis 210 at the time of an attack.

Further, bot nets 101 and the malware infecting malicious clients 105 are increasing in sophistication. For example, malware may include a headless browser 209 that emulates a subset of functions available to browsers 207 utilized by non-malicious clients 225. Accordingly, many of the aforementioned techniques fall short in identifying malicious clients 105 and/or encumber legitimate users.

One example of the increase of sophistication malware infecting malicious clients 105 is the defeat of simple CAPTCHA tests, which, as a result, have become more difficult for legitimate users and bots alike. While more difficult CAPTCHAs are more difficult for malware infections to solve, they are also more difficult for legitimate users and/or intrusive to legitimate user experience and become less effective with increasingly larger bot nets 101. For example, given the fact that a bot net 101 may include thousands, if not millions, of constituent malicious clients 105, even if many fail a more difficult CAPTCHA test, many others may pass and drain resources of the host.

Some increases in sophistication extend beyond the above example, but are less apparent to users. For example, the malware infecting the constituent malicious clients 105 of a bot net 101 may utilize a headless browser 209 framework. One example embodiment of a headless browser 209 is a non-windowed browser framework that often does not include a library (e.g., of DDLs) indicative of traditional DDoS attack malware infections. Additionally, because the headless browser 209 is non-windowed, the malware infection of the constituent computer may not display any readily apparent user facing malicious activity. Thus, a legitimate user of a constituent malicious client 105 of a bot net 101 may be unaware of any nefarious activity.

Example headless browser 209 malware infections such as Phantom.js are capable of following client side browser instructions (e.g., in a fashion similar to a browser 207 of a non-malicious client 225) such as 3xx redirects, JavaScript execution and accepting/sending Cookies with subsequent requests to imitate browser 207 function of non-malicious clients 225. Accordingly, utilization of malware including headless browsers 209 enables malicious client 105 constituents of a bot net 101 to avoid detection through traditional behavior analysis 210 employed by proxies 205 and also avoid constituent malicious client 105 anti-virus software for detecting malware infections.

Further, many of the aforementioned mitigation techniques do not provide adequate protection for functionality 220 of the host 145 that are not user facing, such as API 200A endpoints. Unlike user features 200B, API 200A functionality 220 of the host 145 is often not intended for direct user consumption, but rather by client 105, 225 applications as part of their normal function. As a result, the amount of available information about client behavior for behavior analysis 210 in response to client engagement of API 200A functionality 220 provided by the host 145 may be significantly reduced. Not only does the reduction of available information for analysis make it more difficult for the proxy 205 to distinguish between malicious clients 105 and non-malicious 225, but typically causes a significant increase in the number of false positives. Example client applications using API endpoints can include mobile applications and other API driven applications that automatically engage the host 145 for content (e.g., automatic updates).

A canvas challenge function (CCF), in contrast to the aforementioned techniques, allows a proxy to perform an analysis based on user activity at the client rather client activity when engaging the host. This allows a proxy to more accurately distinguish between non-malicious clients 225 and malicious clients 105 utilizing a headless browser 209. Moreover, the CCF does not require intrusion into legitimate user experience, such as with CAPTCHAs, to distinguish between human and non-human actors.

Figure 3:
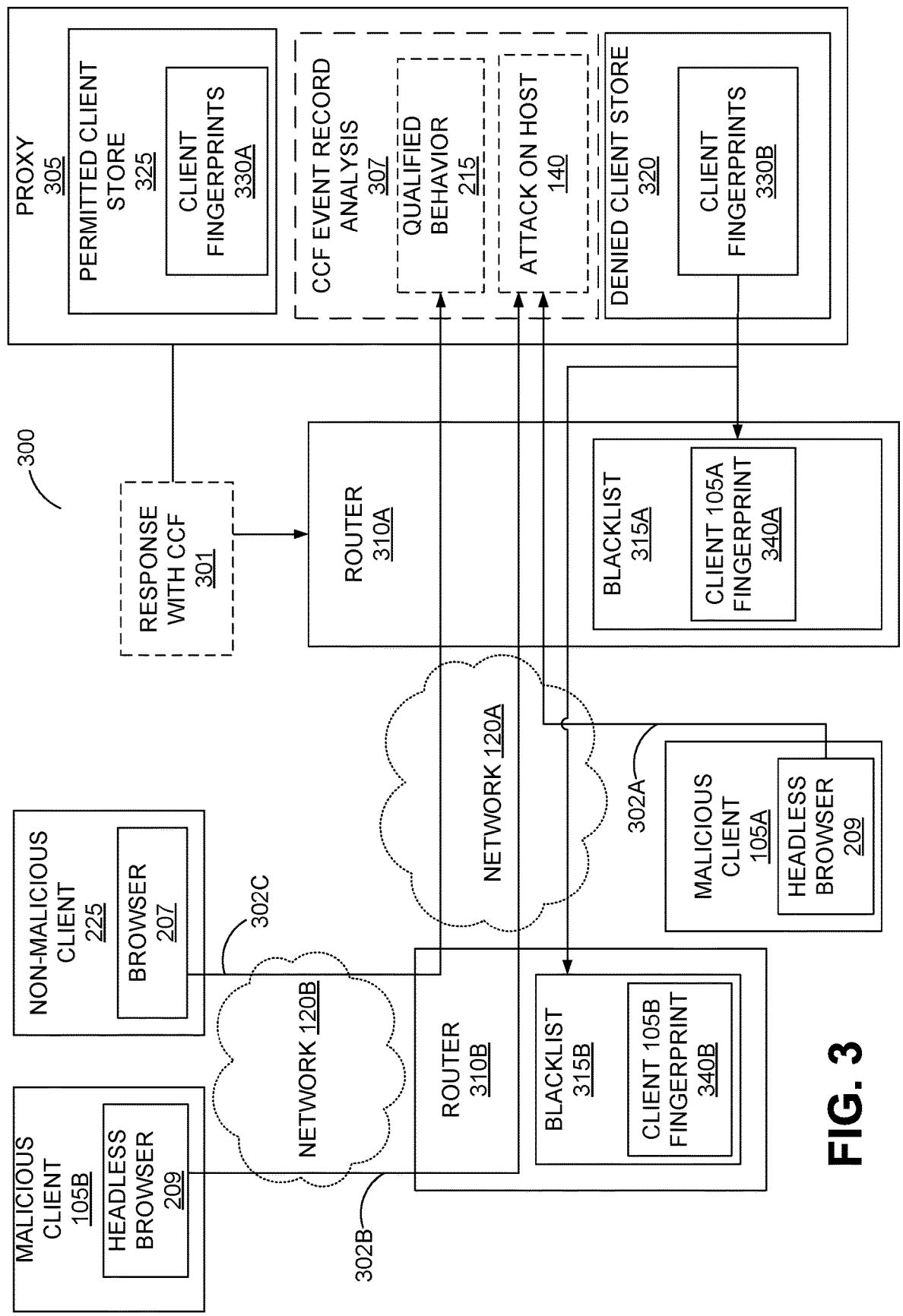
FIG. 3 illustrates a block diagram of an example communications environment including a proxy and a router for mitigating an attack on a host with a canvas challenge function (CCF), according to one example embodiment.

Referring to FIG. 3, it illustrates a block diagram of an example communications environment 300 including a proxy 305 and a router 310 for mitigating an attack on a host 140 with a canvas challenge function (CCF), according to one example embodiment. The environment 300 may include example malicious clients 105A, 105B, which may be constituents of a bot net, a non-malicious client 225, a proxy 305, and routers 310A, 310B.

The proxy 305 may handle traffic between a host (not shown) and clients 105, 225 in a manner similar to that previously described with respect to FIG. 2. Over the proxy (e.g., 205) described with respect to FIG. 2, the proxy 305 of FIG. 3 issues a CCF 301 to clients engaging the host. In turn, the proxy 305 preforms a CCF event record analysis 307 to determine whether event records 302 received from clients are indicative of qualified behavior 215 by a human actor or constitute an attack on the host 140 by a non-human actor.

When a client (e.g., 105A, 105B, and 225) engages the host through the proxy 305 to access application layer features and functionality of a host, the proxy 305 receives a request from the client. For example, the proxy 305 may receive a request for content on the host and pass the request to the host. In turn, the proxy 305 receives a response from the host and includes a CCF in the response prior to transmission to the client. Thus, the proxy 305 modifies the host response to include the CCF and transmits the modified response with the CCF 301 to the client.

The response with the CCF 301 comprises code configured to monitor user interactions (or lack thereof) in order to determine whether there is human activity at the client. When executed, the CCF may monitor for the presence of one or more canvas events over a period of time, e.g., 1-30 seconds, and generates a record of detected canvas events in client memory as a canvas event record. In turn, the CCF causes the clients to provide generated canvas event records 302 to the proxy 305 for CCF event record analysis 307. The CCF event record analysis 307 determines whether the canvas event record corresponding to a client is indicative of qualified behavior 215, e.g., the behavior a human actor, or an attack on the host 140, e.g., the behavior of a non-human actor such as a bot.

The configuration of the code for the CCF is such that human activity is monitored without impacting user experience and/or performance of application layer functionality of the host. For example, a response with the CCF 301 may comprise host content with injected JavaScript code that attaches to "canvas" objects when executed by the client. For example, in HTML content, the code may attach to HTML canvas objects such as mouse, keyboard and scrolling events over/within the HTML content when displayed at the client. In turn, when HTML content including the CCF is displayed within a browser 207 of non-malicious client 225, the CCF detects mouse, keyboard, and/or scrolling events indicative of legitimate user engagement at the non-malicious client 225 with the HTML content and generates a canvas event record of the detected events. The CCF provides the canvas event record 302C of the recorded user activity to the proxy 305 for analysis. For example, the CCF may provide a canvas event record 302 to the proxy 305 by way of a cookie, AJAX call, and/or beacon request. In some example embodiments, the canvas event record is hashed at the client and the hash(s) thereof is provided 302 to the proxy.

Malicious clients 105, e.g., including a headless browser 209, also may receive a response with the CCF 301. In some example embodiments, a malicious client 105 including a headless browser 209 may not execute the CCF as part of its routine, in which case no canvas event record is generated. In some embodiments, a malicious client 105 including a headless browser 209 may execute the CCF challenge, however the generated canvas event record implicates the malicious nature of the client. For example, in instances where a malicious client (e.g., 105B) executes the CCF, the CCF may not detect any mouse, keyboard, and/or scrolling events indicative of legitimate user engagement with HTML content due to the nature of the headless browser 209. The CCF may either not generate a canvas event record (because no events were detected) or generate a canvas event record indicating the absence of any detected events and provide the canvas event record (e.g., 302B) to the proxy 305. Generation of a canvas event record (e.g., 302B) indicating the absence of any detected events and providing the record 302B to the proxy 305 can be useful because receipt of the record for CCF event record analysis 307 indicates that the CCF was executed by the malicious client 105B but that no canvas events were detected.

Considering the evolution of headless browsers 209 for nefarious purposes, it may be possible that a malicious client (e.g., 105A) executes the CCF and the headless browser 209 mimics some level of user engagement causing the generation of a canvas event record with one or more mouse, keyboard and/or scrolling events. In such instances, CCF event record analysis 307 performed by the proxy 305 may determine that the events themselves in the received canvas event record 302A are indicative of a non-human actor. For example, repetition and/or sequence of canvas events performed in rapid succession may be indicative of a non-human actor (e.g., a bot running a script to perform a sequence of actions in an attempt to pass a CCF).

In some example embodiments, the response with the CCF 301 includes code to determine client attribute information for generating a client fingerprint to represent the identity of each client engaging the host. The code to determine client attributes for generating a client fingerprint, when executed by the client, queries the client for client attributes (e.g., of the client and/or browser). The CCF may provide determined client attribute information to the proxy 305 with the canvas event record 302. In other embodiments, a separate response from the response with the CCF 301 may include the code to determine client attribute information for generating the client fingerprint and/or the client attribute information provided to the proxy 305 separate from canvas event records 302. Thus, the CCF may provide a canvas event record 302 to the proxy 305 by way of a cookie, AJAX call, and/or beacon request including both canvas event record information and client attribute information and/or the code for determining the client attribute information may provide the client attribute information to the proxy 305 separately, but in a similar fashion. In some embodiments, the canvas event record and/or client attribute information are hashed at the client and the hash(es) thereof are provided to the proxy 305.

In either instance, the client fingerprint may provide a relatively stable representation of a client such that a client (e.g., 225) may be distinguished from other clients (e.g., 105A, 105B) engaging the host. Thus, the proxy 305 may track provided canvas event records 302 according to client fingerprints. For example, a canvas event record 302C may include a hash of the attributes of non-malicious client 225 such that the proxy 305 may track the canvas event records corresponding to the client 225 in the CCF event record analysis 307. If the canvas event record 302C indicates qualified behavior 215, any combination of client fingerprint 330A information (e.g., hash of client attributes, client IP address, etc.) for the non-malicious client 225 is identified to the permitted client store 325 such that the proxy 305 may allow future requests from the non-malicious client Similarly, if a fingerprint for a malicious client (e.g., 105A) can be determined, the proxy 305 may track whether the client 105A provides any canvas event record 302A in response to a CCF. The proxy 305 may allow for a configurable number of client requests to occur for retrieval of canvas event records 302 prior to identifying the client as malicious or non-malicious. For example, a system Administrator may set a configuration threshold value for failed requests. The proxy 305 services up to the threshold of client requests and provides one or more responses with a CFF 301 to the client requests while monitoring return 302 of any canvas event record. Upon reaching the threshold value of client requests with the client 105A failing to provide a canvas event record 302A or failing to demonstrate qualified behavior 215 based on CCF event record analysis 307 of received canvas event records, the proxy 305 identifies the client as a malicious client for having failed the CCF. Once a malicious client 105 (e.g., a bot) is identified, any combination of client fingerprint 330B information (e.g., hash of client attributes, client IP address, etc.) for the malicious client is identified to the denied client store 320 such that the proxy 305 may block future requests from the malicious client.

In turn, the proxy may build a store of client fingerprints 330A corresponding to permitted clients 325 having passed the CCF and a store of client fingerprints 330B corresponding to denied clients 320 having failed the CCF. Thus, embodiments of the proxy 305 may include a permitted client store 325 and denied client store 320 for storing client fingerprint information. The permitted client store 325 includes client fingerprints 330A of non-malicious clients (e.g., client 225) having passed the CCF 301 and thus permitted access to the host. In contrast, the denied client store 320 includes client fingerprints 330B of clients (e.g., clients 105A, 105B) having failed the CCF 301 and thus denied access to the host.

According to various example embodiment, as clients 225, 105, engage the host, the proxy 305 provides responses with code for CCFs 301 and to determine client attributes for a fingerprint 330 for each client engaging the host. To that end, the proxy 305 may receive a canvas event record 302 and client attributes for a given client and determine whether the canvas event record indicates qualified behavior 215 for human activity at the client or an attack on the host 140 (e.g., returned canvas event record indicating repetitive events, repetitive sequence of events and/or events unable to be performed by a user) based on an analysis of the CCF event record 307. Alternatively, the proxy 305 may receive client attributes for a given client but no canvas event record 302 (e.g., indicative of instances of repeated requests with client executing content but no human interaction) and determine that there is no human activity at the client because no canvas event record is returned for CCF event record analysis 307. Alternatively, the proxy 305 may receive neither client attributes nor canvas event record and determine that there is no human activity at the client because no canvas event record is returned for CCF event record analysis 307 nor are client attributes returned for identification (e.g., indicative of instances of repeated requests without executing content).

The fingerprints 330A of clients passing the CCF challenge are maintained in the permitted client store 325 and the fingerprints 300B of client failing one or more CCF challenges (e.g., up to a threshold) are maintained in the denied client store 320. Because the client fingerprint 330 provides a relatively stable representation of a client such that the proxy 305 may distinguish the client from other clients engaging the host over some period of time (e.g., 5 minutes, an hour, a day, a week, etc.), the proxy may utilize the client fingerprints to permit or deny a client future access to the host. The longer a fingerprint is usable by the proxy 305 to identify a particular client, the more stable the representation. As client configuration, network access points, addresses, etc. change with varying degrees of frequency, the fingerprint need not provide a permanent representation of clients. However, a client fingerprint provides a stable enough representation to substantially identify the non-malicious clients 225 and malicious clients 105 engaging the host during attacks on the host 140 such as DDoS attacks. To that end, the proxy 305 may allow non-malicious clients 225 having a corresponding client fingerprint 330A stored in the permitted client store 325 access to the host during the period of attack with zero to minimal intrusion on legitimate user experience.

Likewise, the proxy 305 may utilize the denied client store 320 containing client fingerprints 330B of malicious clients 105 to deny their access to the features and functionality of the host during non-attack and attack periods. As shown, the environment 300 includes routers 310A and 310B. Embodiments may include none or more routers depending on the configuration. The routers handle communications between endpoints. For example, router 310A handles traffic flowing from network 120A to the proxy 305, and traffic flowing onto the network 120A from the proxy 305. Thus, the communications of clients 105A, 105B, and 225 may flow through the router 310A. Additional routers 310B may also be positioned throughout the environment 300. For example, router 310B handles traffic between network segment 120A and network segment 120B. Thus, the communications of clients 105B and 225 flow from network 120B through router 310B to network 120B. In one embodiment, a router 310 is a standalone computing device, such as server, networking router, load balancer, or collection thereof that routes traffic between entities within the environment 300.

In some example embodiments, a router 310 may include a blacklist 315 for denying the requests of one or more clients. Specifically, the blacklist 315 may contain client fingerprint information corresponding to clients 105 deemed malicious by the proxy 305. For example, the proxy 305 may provide an interface for routers 310 to retrieve client fingerprint 330B information from the denied client store 320 for populating the blacklist 315 or push client fingerprint information from the denied client store to one or more routers for populating the blacklist in order to offload request denials for malicious clients from the proxy. In either instance, a router 310 utilizes the blacklist 315 to deny requests from malicious clients 105 and thus prevent them from reaching the endpoint (e.g., proxy 305). This process of building the blacklist 315 from the denied client store 320, as it relates to the proxy 305, reduces the number of malicious clients 105 engaging the proxy 305 over time and thus the number of malicious requests the proxy 305 handles over the course of an attack on a host 140 to prevent the proxy from being overloaded.

As multiple routers 310 may be positioned between the proxy 305 and a client, e.g., malicious client 105B, the proxy 305 may identify and then provide client fingerprint information 330B from the denied client store 320 to a most upstream router in order to reduce the amount of malicious traffic on one or more networks. For example, the proxy 305 may provide client 105B fingerprint 340B information to router 310B such that requests generated by the malware 115 on malicious client 105B do not flow onto network 120A. Similarly, router 310A may receive client 105A fingerprint 340A information as it is the most upstream router for denying requests generated by the malware on malicious client 105A. In some embodiments, as router 310A may also handle requests from malicious client 105B, it may also receive client 105B fingerprint information 340B. In other example embodiments, all routers may receive fingerprint information for each client identified to the denied client store 320 by the proxy 305. In this way, malicious traffic on the networks 120 and downstream routers (e.g., 310A) may be reduced in addition to reducing malicious requests received at the proxy 305 subsequent to identification of malicious clients 105 to the denied client store 320.

Example System Components

Figure 4:
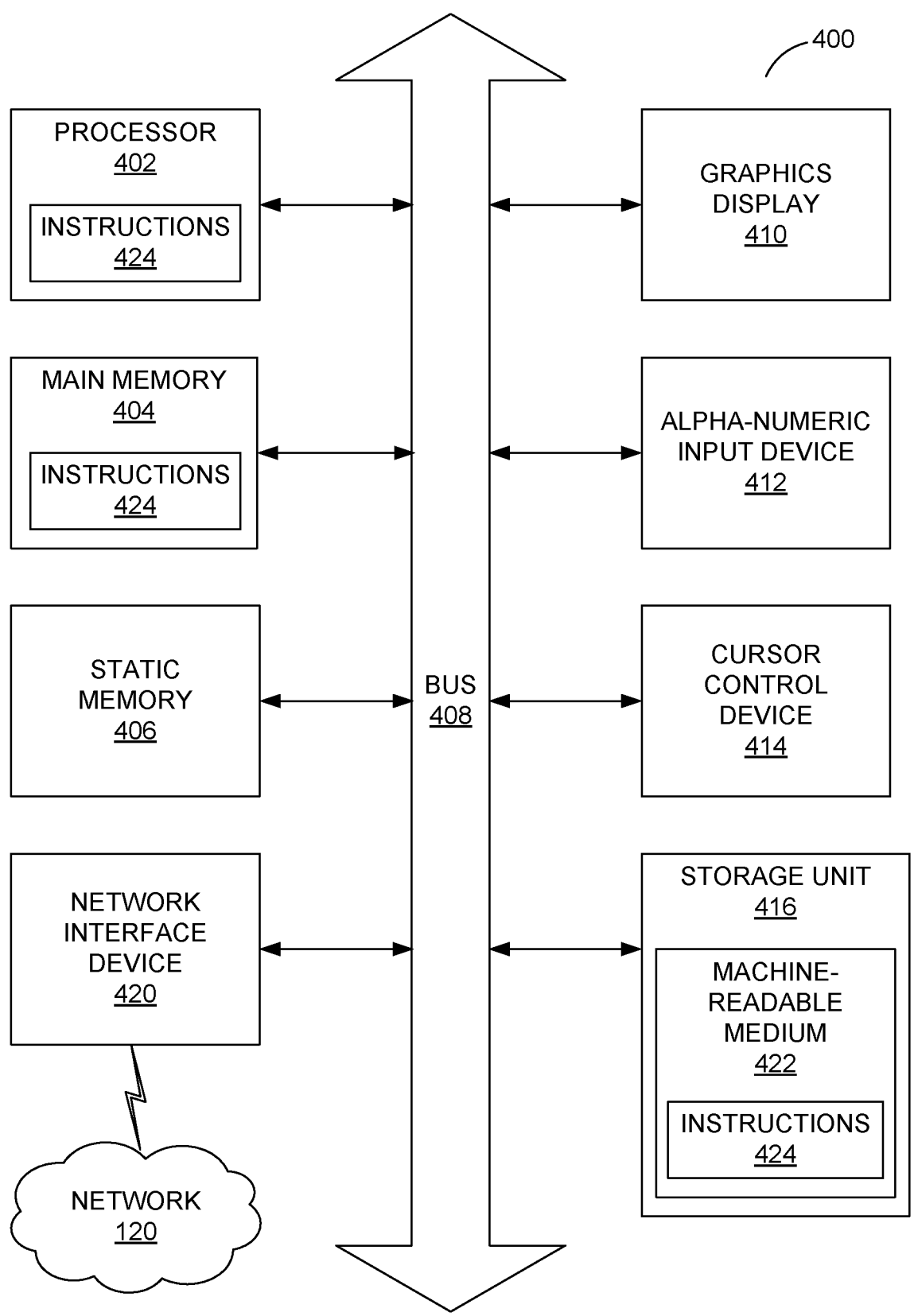
FIG. 4 illustrates an example architecture of a computing device, components of the architecture can corresponding to components in embodiments of computing devices such as clients, host, routers, and proxy.

FIG. 4 illustrates an example architecture of a computing device, components of the architecture can corresponding to components in embodiments of computing devices such as client devices, host, spam client, control server, black market and/or proxy. As such, FIG. 4 illustrates components able to read instructions from a machine-readable medium and execute them on one or more processors (or controllers) to implement embodiments of the disclosed system for mitigating attacks, such as DDoS attacks, on a host, according to one embodiment. For example, clients 105, 107, 135, 225, proxy server 205, 305, host 145, and routers 310, among other entities described herein may include one or more of the components illustrated in FIG. 4. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 300 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or the like. The computer system 400 may also include an optional alphanumeric input device 412 (e.g., a keyboard), a cursor control device 414 (e.g., a mouse, a trackball, a joystick, a motion sensor, or other pointing instrument), a storage unit 416, and a network interface device 420, which also are configured to communicate via the bus 408. It is noted that some example computer systems 300 may operate on a subset of the components, for example, the processor 402, memory 404, and network interface device 420.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 120 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Example Proxy Server

Figure 5:
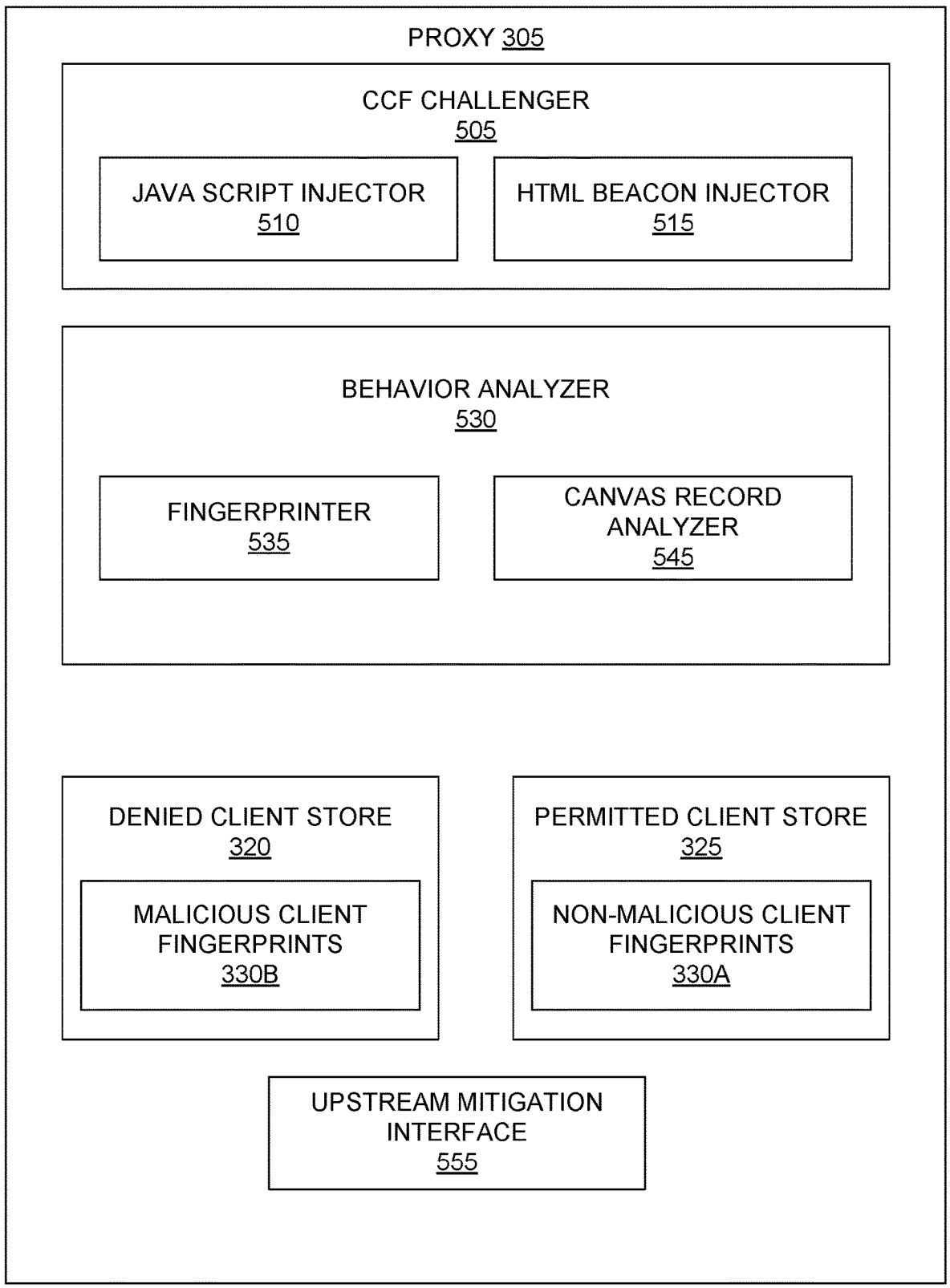
FIG. 5 illustrates a block diagram of a proxy for detecting human activity at a client to mitigate attacks on a host, according to one example embodiment.

FIG. 5 illustrates an example block diagram of a proxy 305 for detecting human activity at a client to mitigate attacks on a host, according to one embodiment. As shown, the example proxy 305 includes a CCF challenger 505, behavior analyzer 530, denied client store 320, permitted client store 325, and an upstream mitigation interface 555.

As network traffic between a client and the host flows through the proxy 305, when a client engages the proxy 305 to access functionality of the host, such as online content, the proxy 305 receives a request from the client for the functionality. For example, the request may be an HTTP(S) request for online content at the host, which the proxy 305 forwards on to the host. In turn, the proxy 305 receives the content requested from the host by the client. The proxy 305 may determine that the client should be challenged to determine whether the client is malicious or non-malicious. In some embodiments, if the client cannot be identified to the permitted client store 325 the proxy 305 determines to challenge the client (clients identified to the denied client store 320 may be blocked upon receipt of a request). In other embodiments, the proxy 305 may routinely challenge clients engaging the host. In one embodiment, the proxy 305 calls the CCF Challenger 505 to provide a CCF challenge to a client engaging the host.

The CCF challenger 505 includes a java script injector 510 and an HTML beacon injector 515. By way of example, the CCF challenger 505 receives the host response destined for the client and modifies the response to include the CCF. In turn, the modified response with the CCF is transmitted to the client.

In one example embodiment, the java script injector 510 injects a small portion of JavaScript code including the CCF into the response that will be executed by the client. The small portion of code for the CCF may not alter functionality of the content of the response, but will be executed by the client with the content. In some embodiment, the java script injector 510 injects a shared encryption key in the CCF JavaScript code to allow for shared encryption and decryption of CCF data collected at the client upon return to the proxy 305. In some embodiments, once CCF generates the canvas event record, the CCF encrypts the information with a (varying) encryption key using one of several encryption algorithms available to CCF.

The CCF code injected in the content of the response by the java scrip injector 510 is configured to attach to canvas events within the content when loaded by the client. For example, a client application, such as a browser including a JavaScript engine executes the CCF code when content such as an HTML document is loaded by the browser of the client for presentation on a screen of the client. The executed CCF code causes the client JavaScript engine to listen for canvas events indicative of human interaction within the content loaded by the browser, such as mouse movement, keyboard presses and scrolling events. In turn, the CCF code causes the client JavaScript engine to record detected canvas events for transmission back to the proxy 305. In one embodiment, the CCF records the events in a CCF data structure decipherable at the proxy 305. The CCF data structure, or canvas event record, may comprise a list of detected canvas events including event type, event data (mouse coordinates, keys pressed, scroll activity), and a current timestamp for the event as reported by the client/client browser. In turn, the CCF code makes the generated canvas event record available to the proxy 305.

In some example embodiments the CCF determines client fingerprint information. Thus, the code for the CCF injected by the java script injector 510 into a host response destined for a client may also include code for determining a client fingerprint. For example, the small portion of JavaScript code including the CCF injected into the response by the java script injector 510 may also include JavaScript code for fingerprinting the client which determines attributes about the client. The portion of JavaScript code for fingerprinting the client causes the JavaScript engine of the client to query the client for client attributes such as operating system type, operating system version, system language, screen size, screen resolution, browser type, browser installed fonts, browser installed plugins, browser version, system timezone, application type, application version, application installed plugins, etc. Accordingly, upon receipt of the content modified with a CCF including code for determining a client fingerprint, a client application, such as a browser including a JavaScript engine executes the portion of injected JavaScript code for determining the client fingerprint which causes the JavaScript engine to request for browser runtime information including the client attributes. In turn, the CCF including code for determining the client fingerprint makes the client attributes retrieved by the client JavaScript engine available to the proxy 305.

According to various example embodiments, the canvas event record and/or client attributes may be hashed and/or encrypted at the client prior to receipt at the behavior analyzer 530.

In one example embodiment, the CCF makes the canvas event record and/or client attributes available to the proxy 305 by generating a cookie on the client with a data structure including the canvas event record and client attributes for the fingerprint of the client. The CCF may hash and/or encrypt one or more of the canvas event record and the attributes of the client, in which case the cookie includes the encrypted and/or hash values. For example, the hash value of the client fingerprint may be set in an HTTP header of the cookie and encrypted canvas event record values in fields of the cookie. In turn, when the client next engages the host, the behavior analyzer 530 retrieves the canvas event records and/or client attributes from the cookie.

The behavior analyzer 530 listens for return of canvas event record and/or client fingerprint information in/on cookie values set by the CFF code, asynchronous JavaScript+XML (AJAX) requests and/or web beacon requests. The behavior analyzer 530 may include a canvas record analyzer 545 and a fingerprinter 535 to process data received from the client. By way of example, the behavior analyzer 530 passes received client attributes to the fingerprinter 535 for fingerprinting the client and/or received canvas event records to the canvas record analyzer 545 for analyzing canvases events (or lack thereof) detected at the client. The behavior analyzer 530 may decrypt (if necessary, based on the shared encryption key provide to the client) the received canvas event record passed to the canvas record analyzer 545. The fingerprinter 535 generates the client fingerprint based on the received client attributes and/or hash thereof and identifies an IP address of the client (e.g., from the client response). In turn, the canvas record analyzer 545 may store received canvas event record data as Event/Values associated with the corresponding client fingerprint information for lookup. Accordingly, the canvas record analyzer 545 may examine the event/values from returned canvas event records associated with a given client to determine whether the event/values are indicative of qualified human behavior or an attack on the host.

In one example embodiment, the behavior analyzer 530 retrieves the canvas event record and/or client attributes with asynchronous JavaScript+XML (AJAX) requests. For example, the portion of JavaScript provided to client for the CCF, when executed, may be configured to perform a call to the proxy 305 from the client JavaScript engine based on instructions in the portion of executed JavaScript. In turn, the behavior analyzer 530 communicates with the client JavaScript engine via AJAX to retrieve the canvas event record and/or client attributes, which are provided to the canvas record analyzer 545 and/or fingerprinter 535, respectively.

In some example embodiments, the behavior analyzer 530 retrieves canvas event records and/or client attributes via an HTML beacon request. In order to retrieve a canvas event record and/or client attributes via an HTML beacon, the behavior analyzer 530 listens for a requests from the client to load a beacon, such as a 1×1 pixel, from the proxy 305. The client requests the beacon (e.g., as an attempt to retrieve an image) with the canvas event record and/or client attributes included in a query string parameter of the request. In turn, the behavior analyzer 530 provides the canvas event record and/or client attributes to the canvas record analyzer 545 and/or fingerprinter 535, respectively.

Depending on the embodiment, the CCF challenger 505 may include an HTML beacon injector 515 configured to perform HTML beacon injection subsequent to or coincident with providing the CCF JavaScript code (and/or fingerprint JavaScript code) via the java script injector 510. As an example, the client may request a feature or functionality of the host, which the proxy 305 receives and passes on to the host. In turn, the proxy 305 receives a response from the host destined for the client. If the client has not yet been challenged and/or a fingerprint determined for the client, the proxy 305 provides the response to the CCF challenger 505. The CCF challenger 505 modifies the response prior to passing the response to the client by passing the response through the HTML beacon injector 515. In some example embodiments, the response may be passed through both the java script injector 510 and the beacon injector 515. In other embodiments, the response may be passed through the beacon injector 515 subsequent to a response passed through the java script injector 510 and transmitted to the client.

The HTML beacon injector 515 injects a small pixel (e.g., 1×1) or "beacon" that the client will attempt to retrieve into the content, such as HTML content, included in the response destined for the client. The address of the beacon is set as the address of the proxy 305 such that attempts to retrieve the beacon (e.g., as an image) are directed to the proxy and accessible by the behavior analyzer 530. Parameters of the beacon request (e.g., a query string to retrieve the beacon) are set based on the canvas event record and/or client attributes (which may be encrypted and/or hashed). Thus, when the client application such as browser renders the received content, the browser generates a request for the beacon from the behavior analyzer 530 that includes canvas event record and/or the client attributes. In some embodiments, the HTML beacon injector 515 injects multiple beacons for the retrieval of canvas event record information and client attribute information separately.

The fingerprinter 535 determines a fingerprint of a client engaging a host. The fingerprint represents the identity of the client at the proxy 305, such that different clients are distinguishable from each other. Many systems use internet protocol (IP) addresses to identify clients. However, IP addresses offer a very crude approximation of client identity because IP addresses may change over time (e.g., through the dynamic host control protocol, or DHCP). In addition, many clients may share a same IP address. For example, clients in remote geographies such as South America or China utilize "Mega Proxies" which hide the true IP addresses of individual clients. Thus, relying on IP addresses makes it difficult to distinguish individual clients because multiple clients may have a same IP address and/or frequently have a new IP address as seen by the proxy 305. Moreover, blocking an IP address of a malicious client may inadvertently capture many non-malicious clients. A client fingerprint more uniquely represents a given client than its IP address alone such that individual clients may be more uniquely identified and associated with their returned canvas event records.

In one example embodiment, the fingerprinter 535 determines the fingerprint of a client based on one or more attributes of the client. Attributes of the client utilized in a fingerprint may include an operating system type, operating system version, system language, screen size, screen resolution, browser type, browser installed fonts, browser installed plugins, browser version, system timezone, application type, application version, application installed plugins, etc. or other determinable attributes. The combination of these client attributes, which may be represented as Boolean (true/false) values, whole values, or character value make up the fingerprint of the client. In some example embodiments, the values are hashed, in which case the fingerprint of the client may be a hash value of the client attributes.

The fingerprinter 535 may hash the combination of received client attributes using a one-way hashing function to generate a (fairly) unique and stable string value (e.g., the fingerprint) that uniquely identifies the client. In some example embodiments, the client attributes are hashed at the client and the hash value thereof is received by the fingerprinter 535. In turn, the fingerprinter 535 may utilize the received hash value as the fingerprint that uniquely identifies the client. In either instance, the fingerprinter 535 stores the combination of the client fingerprint and client address (e.g., identified from the network traffic associated with the client) for client fingerprint information provides a relatively stable representation of the client. Thus, the fingerprint information determines by the fingerprinter 535 enables the proxy 305 to more uniquely identify clients and allows the canvas record analyzer 545 to track the canvas event records returned by a given client.

Although client IP address remains useful, combinations of these attributes more accurately represent individual clients over time than IP address alone. For example, while a client IP address may change throughout the day, an OS version and type combined with browser version and type along with screen size and screen resolution are much less likely to change, which provides a much more stable representation of the client identity than a changing IP address. Thus, even when a client IP address changes, the proxy 305 may still be able to uniquely identify the client based on the representative combination of attributes in the fingerprint and the canvas event record analyzer 545 analyze canvas event records from a given client over time.

The canvas even record analyzer 545 examines returned canvas event records associated with a client to determine whether the client is malicious or non-malicious. For example, the canvas record analyzer 545 may inspect one or more timestamps recorded in the data of returned canvas event records. Typically, a human actor interacts with the browser upon receiving content prior to requesting new content, even if the action is only to move the mouse or input key-strokes (which take time to perform) to request the new content. Additionally, the canvas record analyzer 545 may inspect the fingerprint corresponding to the client to determine a device type for analysis of canvas event record. For example, a device fingerprint may indicate a client device with a touch-screen, or alternatively, one without. Different input characteristics in the event/values in the canvas event record may be expected according to device type. As an example, a key-stroke combination or mouse movement may be expected for a client without a touch screen (e.g., desktop client) to request new content whereas such inputs may not be present on a touch-screen device where user engagement of the touch screen is expected instead.

The canvas record analyzer 545 also may determine whether a given client returned a canvas event record or returned a canvas event record without any event/values (e.g., the CCF did not detect any canvas events). The absence of event/values for any interactions (canvas events) within the content indicates the client actions are performed by a non-human actor such as a bot, and therefore malicious (failing the CCF). The presence of event/values for interactions in the canvas event record may serve as an initial indication of a human actor, however, the canvas record analyzer 545 may perform additional analysis to determine whether a client passes or fails the CCF.

The canvas record analyzer 545 may examine a set of canvas event records and the event/values therein received from the client (e.g., over the course of several requests where the CCF challenger 505 inserts the CCF into requested content provided to the client). For example, the canvas record analyzer 545 may look up previously received canvas event records maintained by the canvas record analyzer 545 according to client fingerprint information such as by the hash of the client attributes and/or client IP address. In turn, the canvas record analyzer 545 examines the set of canvas event records to determine whether there are variations in the event/values and their timestamps across the canvas event records which correspond to differing sequences of recorded canvas events and interaction within the content provided to the client over time. Variations in the event/values and timestamps across different canvas event records are indicative of a human actor engaging the content in different ways and thus the canvas record analyzer 545 identifies the activities at the client as qualified user behavior (passing the CCF). Accordingly, the canvas record analyzer 545 may identify the client as non-malicious.

In examining received canvas event records with event/values, the canvas record analyzer 545 may determine that the activities at the client do not correspond to qualified user behavior. For example, highly repetitive event/values and associated timestamps in a canvas event record and/or across multiple canvas event records (e.g., same canvas actions performed repetitively) may be indicative of the spoofing of canvas events in the canvas event record by malicious clients (e.g., bot and/or script). In an example embodiment the canvas record analyzer 545 examines the canvas records to determine whether there is variation in the sequence of event/values and timestamps in the record(s). For example, the repetition of a same event/value in an event record, the repetition of a same sequence of event/value(s) in a record, and/or the repetition of a same sequence of event/values(s) across multiple records may all implicate a non-human actor (e.g., bot and/or script). Similarly, repetition in the timestamps across event/values (even though they may differ) may implicate a non-human actor. In an example embodiment, the canvas record analyzer 545 may determine the difference between pairs of timestamps to determine whether the elapsed time between pairs of event/values is relatively constant.

By way of an example, if event/value (A) is followed by event/value (B) which is followed by event/value (C), a same difference in timestamps between A→B and B→C may be indicative of a non-human actor. The canvas record analyzer 545 may also examine pairs across multiple records to determine whether the difference in timestamps between A→B, B→C, etc. in one record occurs across multiple others records receive from the client with a same difference in timestamps, which indicates that a non-human actor is repeatedly performing events (which may differ but are performed receptively) in a similar fashion. The canvas record analyzer 545 determines that clients having records with event/values(s) and timestamps exhibiting these characteristics do not exhibit qualified behavior (failing the CCF).

In extreme instances of malicious client sophistication, event/values and their timestamps may be (semi) randomized. By way of example, a headless browser may randomize the sequence of actions it performs (e.g., A→B→C→D; B→C→A→D; etc.) and how it performs them (e.g., a randomized duration between key-strokes, randomized duration between selections, randomized length of time in a mouse/scroll movement before performing a selection, and randomized mouse/scroll movement, etc.). Thus, a sophisticated headless browser may exhibit variations in event/values and their timestamps in an attempt to spoof canvas events in a more human-like fashion than simply their existence in the canvas event record.

In some example embodiments, the canvas event analyzer 545 generates one or more models of qualified user behavior associated with clients known (or determined to be) non-malicious. The canvas event records, as described previously, may include event/values and timestamps associated with human interactions within content such as touch or mouse click selection, keyboard, scroll, keyboard stroke, position (e.g., x, y coordinates) of interaction, value (key pressed, length of scroll, etc.) of interaction, and timestamps associated with the interactions. For given content provided to clients with a CCF, such as a webpage within a website, the aggregation of received canvas records associated with non-malicious clients having interacted with the webpage indicates common interactions within the content, common sequences thereof, and common attributes of how they were performed based on their rate of incidence. The canvas event analyzer 545 aggregates the canvas records associated with the non-malicious clients having interacted with given content (e.g., a specific webpage within a website) and generates a model indicating the likelihood of a given interaction (e.g., event with given event attributes) to occur within the webpage and/or at a given area within the webpage (e.g., from x, y coordinates). In some example embodiments, the aggregation of records is broken down by device type (identifiable from the association of non-malicious client fingerprints with received canvas records) in order to better distinguish between how a mobile device user (e.g., utilizing a touch screen) interacts with the content as opposed to a desktop user (e.g., utilizing a keyboard and mouse).

By way of example, the model may comprise in part data that may be conceptualized as a heat map indicating the prevalence of an event (e.g., selection with mouse) at a given location within the webpage. For example, the selection of a "check out" option directly from the domain page (e.g., www.shopforstuff.com/) may be determined to be significantly less prevalent than the selection of a product category to first look at "stuff" to purchase. In another example, the selection to "check out" may be significantly more prevalent from a shopping cart page (e.g., www.shopforstuff.com/cart) than a "contact site administrator" selection. The random selection of website features atypical of legitimate user behavior for a given webpage within the website may implicate malicious clients that randomize events/values and timestamps to spoof canvas record information.

The canvas event analyzer 545 examines a comparison of the canvas event records received from a client with the model to determine the typicality of interactions (e.g., how well the event/values and timestamps match expected behavior represented by the model). Because legitimate human actors typically do not exhibit random behavior when interacting with content, e.g., in the example context of an ecommerce site they exhibit some purpose within their activities such as browsing product and making a purchase, randomized behavior spoofed in a canvas event record when compared against aggregated user interaction is highly atypical. The canvas event analyzer 545 may compare the determined typicality of the interactions from the comparison of the canvas event records received from the client with the model to a threshold to identify whether the client is malicious or non-malicious. Thus, the canvas event analyzer 545 may determine that a client is malicious even where event/values and their timestamps in canvas event record exhibit variation (e.g., randomized) but are not typical of a model of qualified user behavior (fail CCF).

Thus, the canvas record analyzer 545 may identify the activities at the client as an attack on the host. Accordingly, the canvas record analyzer 545 may identify the client as malicious even through event/values exist in the canvas event record.

In some embodiments, the canvas record analyzer 545 allows the client up to a threshold of opportunities to pass the CCF in order to mitigate false positives. For example, the canvas record analyzer 545 may check the number of requests made by the client by looking up the number of issued CCFs (responses with CCF transmitted to the client) and/or number of received canvas event records maintained by the canvas record analyzer 545 according to client fingerprint information such as by the hash of the client attributes and/or client IP address. The canvas record analyzer 545 may compare the number of requests made by the client to a threshold number of requests allowed by a client without passing the CCF (e.g., no canvas event record has been received, no event/values present in returned canvas event records, and/or the event/values in returned canvas events records does not indicate a human actor). In turn, if the number of requests made by the client exceeds the allowed threshold without returning valid canvas event record data, the canvas record analyzer 545 may determine the client has failed the CCF and is malicious. Alternatively, if one or more valid canvas event records are returned even after one or more failed CCFs (e.g., prior to reaching the threshold of allowed failed requests), the canvas record analyzer 545 may classify the client as non-malicious and permit communications with the host—even during a detected DDoS attack period.

The canvas record analyzer 545 stores the fingerprint information of clients 330A having passed the CCF and thus determined to be non-malicious in the permitted client store 325. The proxy utilizes the permitted client store 325 to allow non-malicious clients access to the host. The canvas record analyzer 545 stores the fingerprint information of client 330B having failed the CCF (or one or more up to a threshold) and thus determined to be malicious in the denied client store 320 to deny malicious clients access to the host.

The upstream mitigation interface 555 provides a communication interface to upstream routers, firewalls, or other mitigation devices for denying client access further up the communication pathway from the client to the proxy 305 to reduce the amount of malicious network traffic on the network and offload processing from the proxy and/or other downstream devices. For example, the upstream mitigation interface 555 may provide client fingerprint 330B information such as corresponding IP addresses of clients identified to the denied client store 320 to upstream routers, firewalls or other mitigation devices for blocking at the IP level as these devices are more suitable to filtering high volumes of traffic. In some embodiments, the upstream devices may utilize other client fingerprint information in addition to IP address information.

In one example embodiment, the upstream mitigation interface 555 places the IP addresses of denied clients into a message queue. In turn, a router may listen to the message queue and pull the IPs from the message queue to block those client requests. In other embodiments, the upstream mitigation interface 555 may push IP addressed added to the message queue to one or more upstream mitigation devices.

Challenging a Client

Figure 6A:
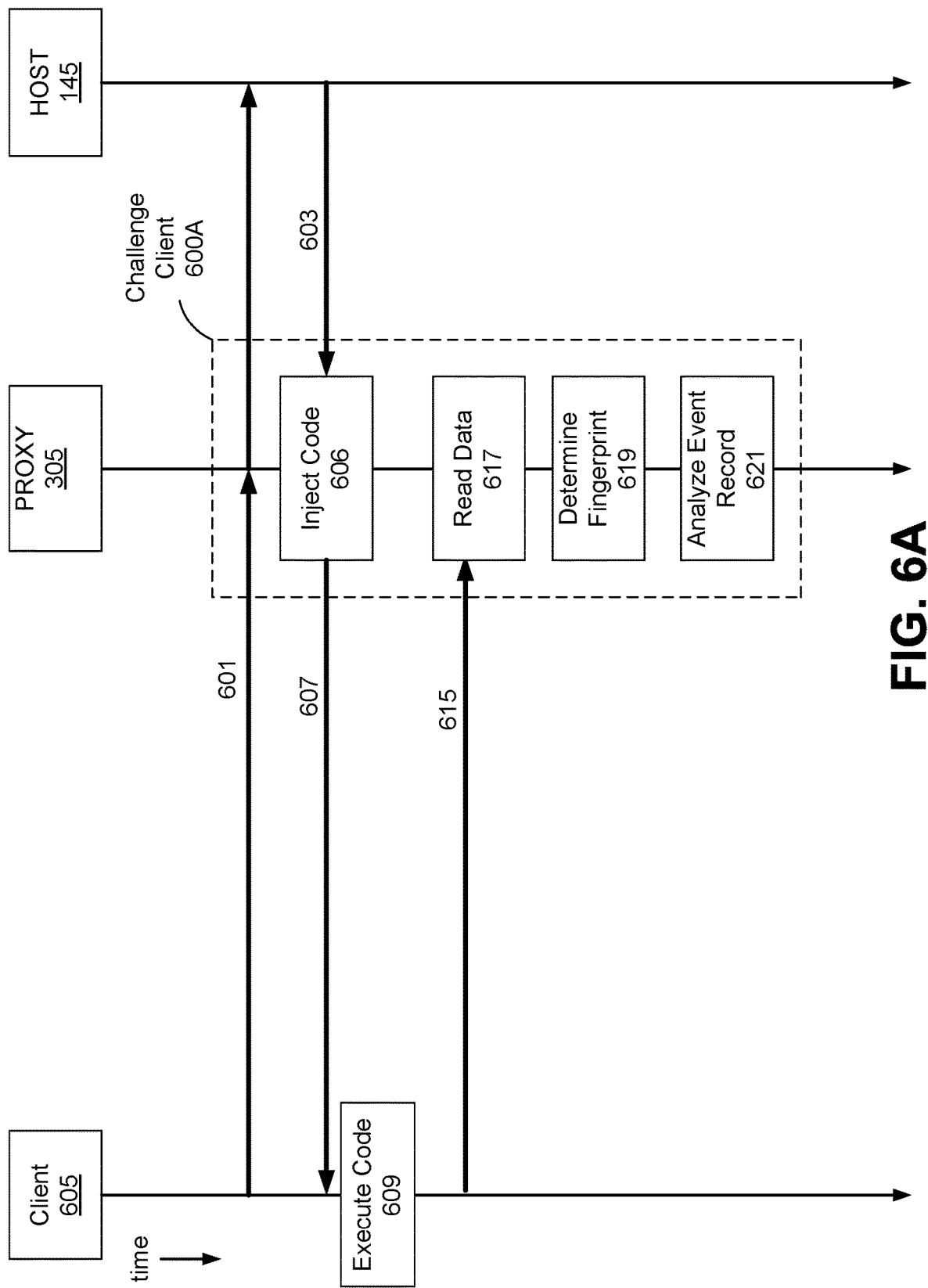
FIG. 6A illustrates an example event trace for challenging a client with a CCF, according to an example embodiment.

FIG. 6A illustrates an example event trace for challenging 600A a client with a CCF, according to an embodiment. FIG. 6A shows a client 605, proxy 305, and host 145. The proxy server 305 receives an initial request 601 from the client 605 for a feature or functionality of the host 145. For example, a client 605 application such as a browser may request a web page provided by the host. The proxy 305 passes the request 601 to the host 145 which generates a response 603 to the client request and passes the response to the proxy 305. If the client 605 is unknown to the proxy 305 or not identified in a permitted client store, the proxy 305 may challenge the client 600A with a CCF.

To challenge 600A the client 605 with a CCF, the proxy 305 modifies the response 603 from the host 145 by injecting 606 executable code into the host response 603. In turn, the proxy 305 transmits the modified response 607 including the executable code to the client 605. In turn, the client 605 executes 609 the injected code. The injected code 606, when executed 609, attaches to canvas events such as mouse coordinates, keys pressed, and/or scroll activity within the content and records detected events to a canvas event record. The injected code 606 may include an encryption key to encrypt the information about the detected events. The canvas event record is provided 615 to the proxy 305, which reads 617 and stores the canvas event record for event record analysis 621 for the client 605.

In some example embodiments, the injected code 606 additionally determines attributes about the client 605. For example, the client 605 may execute 609 JavaScript code that causes the JavaScript engine of the client to query the client for client attributes such as operating system type, operating system version, system language, screen size, screen resolution, browser type, browser installed fonts, browser installed plugins, browser version, system timezone, application type, application version, application installed plugins, etc. The client attributes and/or hash thereof are then provided 615 to the proxy 305, which reads 617 and stores the client attributes for determining the fingerprint 619 for the client 605.

In one example embodiment, the portion of JavaScript executed 609 by the client generates a cookie on the client including the canvas event record with detected event data and/or the client attribute data for the fingerprint of the client and sets values of the cookie with the data. In turn, when the client 605 attempts to engage the host 145, the cookie is provided 615 to the proxy 305 which reads 617 the data stored in the cookie to obtain the canvas events record and/or client attributes (or hash thereof).

In one example embodiment, the portion of JavaScript executed 609 by the client causes the client JavaScript engine to perform an AJAX call 615 to the proxy 305 to provide the canvas event record and/or client attribute data. In turn, the proxy 305 reads 617 the canvas event record data and/or client attributes (or hash thereof) received from the JavaScript engine.

Once the proxy 305 receives client attribute information and/or a hash thereof, the proxy 305 determines a fingerprint 619 for the client. Once the proxy 305 receives one or more canvas event records, which the proxy may track by the determined fingerprint 619 for the client, the proxy analyzes the event record 621 to determine whether the client is malicious (fails the CCF) or non-malicious (passes the CCF) based on the detected events (if any) in the canvas event records.

Figure 6B:
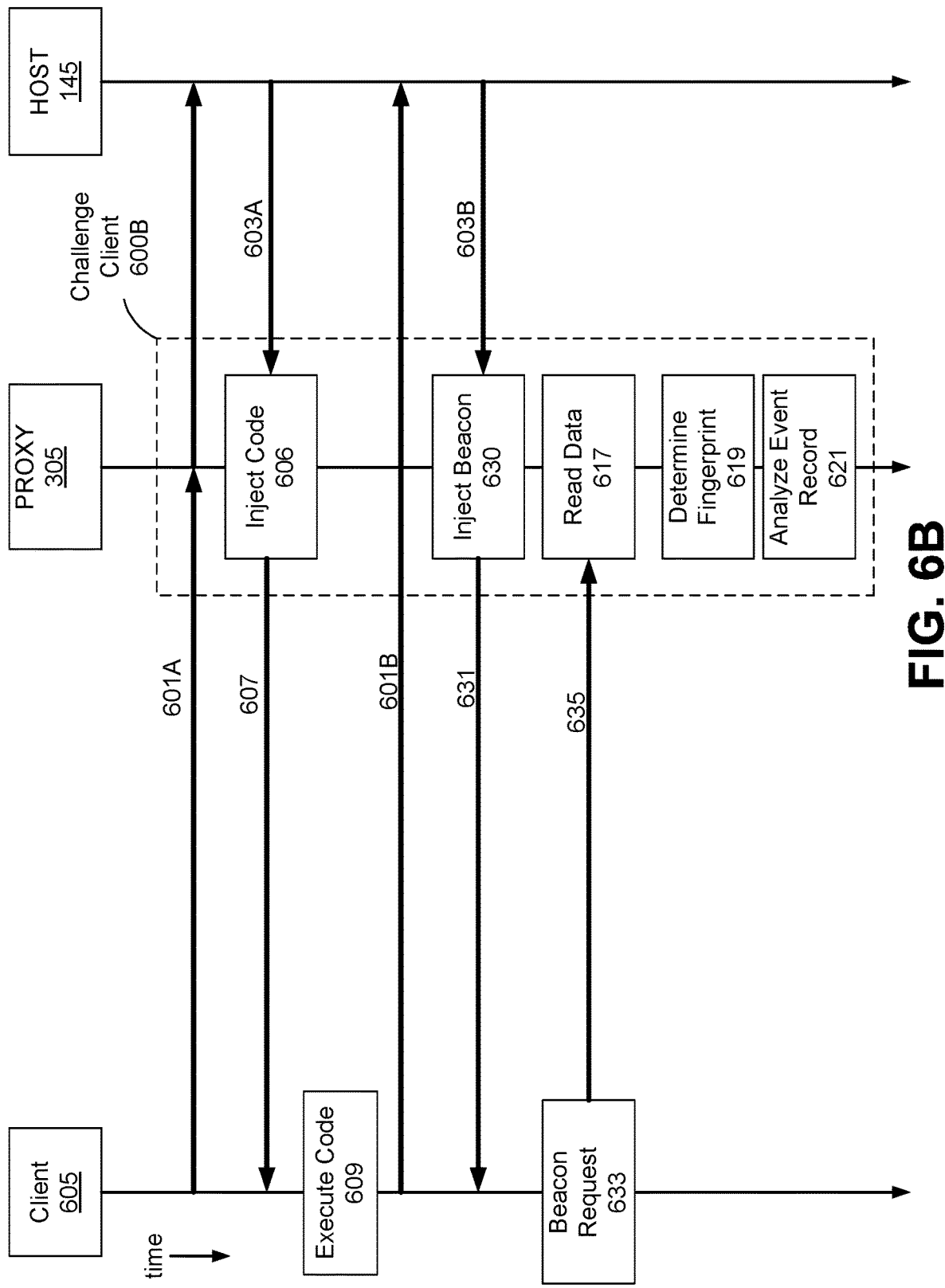
FIG. 6B illustrates an example event trace for challenging a client with a CCF, according to an example embodiment.

FIG. 6B illustrates an example event trace for challenging 600B a client with a CCF, according to an embodiment. FIG. 6B shows a client 605, proxy 305, and host 145. The proxy server 305 receives an initial request 601A from the client 605 for a feature or functionality of the host 145. For example, a client 605 application such as a browser may request a web page provided by the host. The proxy 305 passes the request 601A to the host 145 which generates a response 603A to the client request and passes the response to the proxy 305. If the client 605 is unknown to the proxy 305 or not identified in a permitted client store, the proxy 305 may challenge the client 600B with a CCF.

To challenge 600B the client 605 with a CCF, the proxy 305 modifies the response 603A from the host 145 by injecting 606 executable code into the host response 603A. In turn, the proxy 305 transmits the modified response 607 including the executable code to the client 605. In turn, the client 605 executes 609 the injected code. The injected code 606, when executed 609, attaches to canvas events such as mouse coordinates, keys pressed, and/or scroll activity within the content and records detected events to a canvas event record. The injected code 606 may include an encryption key to encrypt the information about the detected events. The canvas event record may then be retrieved by the proxy 305 through a beacon request 633.

In some example embodiments, the injected code 606 additionally determines attributes about the client 605. For example, the client 605 may execute 609 JavaScript code that causes the JavaScript engine of the client to query the client for client attributes such as operating system type, operating system version, system language, screen size, screen resolution, browser type, browser installed fonts, browser installed plugins, browser version, system timezone, application type, application version, application installed plugins, etc. The client attributes and/or hash thereof may then be retrieved by the proxy 305 through a beacon request 633.

In order to retrieve canvas event records and/or client attributes through a beacon request 633, the proxy 305 identifies a request 601B from the client 605 for features or functionality of the host 145. In some embodiments, request 601B and response 603B may be the same request and response as initial request 601A and host response 603A. In other example embodiments, request 601B and response 603B may correspond to a request subsequent to initial request 601A and host response subsequent to host response 603A.

The proxy 305 passes the request 601B to the host 145 which generates a response 603B to the client request and passes the response to the proxy 305. The proxy 305 modifies the response 603B from the host 145 by injecting 630 a beacon into the host response 603B. In turn, the proxy 305 transmits the modified response 631 including the beacon to the client 605. In some embodiments, the proxy 305 injects 630 separate beacons in the same response 603A or in different responses to retrieve canvas event records and/or client attributes as necessary.

The injected beacon 630 may be a small pixel (e.g., 1×1) that the client will attempt to retrieve 635 by a beacon request 633. For example, the address of the beacon may be set as the address of the proxy 305 such that attempts to retrieve 635 the beacon (e.g., as an image) are directed to the proxy. Parameters of the beacon request 633 (e.g., a query string to retrieve the beacon) are set based on the canvas event record and/or client attribute data and read 617 by the proxy 305 when the client 605 attempts to retrieve 625 the beacon. In turn, the proxy 305 reads 617 and stores the canvas event record for event record analysis 621 for the client 605 and/or determines the fingerprint 619 of the client 605 from the client attributes read 617 from the parameters of the request.

Once the proxy 305 receives client attribute information and/or a hash thereof when the client 605 attempts to retrieve 635 a beacon, the proxy 305 determines a fingerprint 619 for the client. Once the proxy 305 receives one or more canvas event records when the client 605 attempts to retrieve 635 a beacon, which the proxy may track by the determined fingerprint 619 for the client, the proxy analyzes the event record 621 to determine whether the client is malicious (fails the CCF) or non-malicious (passes the CCF) based on the detected events (if any) in the canvas event records.

Additional Configuration Considerations

The disclosed configurations for detecting human activity through browser canvas events to distinguish between human and non-human actors the effects of an attack on a host, such as an application layer (layer 7) DDoS attack, can be mitigated. Thus, by implementing proxy servers similar to those described herein the security and resilience of hosts to DDoS attacks can be improved. Additionally, user experience is improved because the detection of human activity through browser canvas events does not intrude on the usability of the features and functionality of the host.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms such as the CCF challenger, behavior analyzer, denied client store, permitted client store, upstream mitigation interface, etc. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 402) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 1, 2, and 3 or with FIGS. 5, 6A and 6B) described herein may be performed, at least partially, by one or more processors (e.g., processor 402) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 404). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system, method, and computer readable storage medium storing computer program instructions for detecting human activity through browser canvas events to distinguish between human and non-human actors for mitigating distributed denial of service (DDoS) attack on the host through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for detecting human activity at a client device by a proxy server comprising:
responsive to receiving, by the proxy server, an initial request for online content of a host server from the client device:
routing, by the proxy server, the initial request to the host server,
receiving, by the proxy server, a response from the host server, wherein the response includes the requested online content,
modifying, by the proxy server, the response from the host server to include a client device challenge prior to transmission of the modified response to the client device by the proxy server by:
injecting, by the proxy server, a first portion of code within the requested online content, wherein the first portion of code is configured to monitor, by the proxy server, for canvas events within the client device and create records of detected canvas events in a client device memory,
injecting, by the proxy server, a second portion of code, wherein the second portion of code is configured to determine 1) client device attributes by querying for one or more of browser and client device runtime information when executed by the client device, and 2) an IP address of the client device,
injecting, by the proxy server, in the first and second portions of code, a shared encryption key for encrypting the canvas event record and the client device attributes at the client device,
injecting, by the proxy server, a beacon within the requested online content, wherein the beacon includes a 1×1 pixel image and a query string, represented by a beacon request, to retrieve an image of the beacon from the proxy server,
wherein the client device attributes and the canvas event record, when the image of the beacon request is retrieved by the client device, are retrieved by the proxy server through the beacon request,
wherein the proxy server decrypts the retrieved client device attributes and the canvas event record based on the shared encryption key provided to the client device, and
generating, by the proxy server, a fingerprint of the client device based on the client device attributes received from the client device, the record of detected canvas events within the online content by the client device received from the client device, and the IP address of the client device received from the client device;
tracking, by the proxy server, the received client device attributes received from the client device, the record of detected canvas events within the online content by the client device received from the client device, and the IP address received from the client device via the fingerprint of the client device;
responsive to tracking, by the proxy server, the fingerprint of the client device, determining, by the proxy server, whether the received client device attributes, the received record of detected canvas events within the online content by the client device, and the received IP address from the client device are indicative of human activity;
responsive to determining that the received client device attributes, the received record of detected canvas events within the online content by the client device, and the received IP address from the client device are indicative of human activity, transmitting the modified response to the client device;
responsive to receiving the record of detected canvas events within the online content from the client device when the image of the beacon request has been retrieved by the client device:
determining whether the record of detected canvas events includes detected canvas events which are indicative of human activity;
determining whether the record includes that the image of the beacon request has been retrieved by the client device in order to provide the client device attributes to the proxy server which are indicative of human activity; and
responsive to determining the record of detected canvas events when the image of the beacon request has been retrieved by the client device are indicative of human activity, permitting the client device access to the requested online content of the host server,
wherein the proxy server maintains fingerprints of client devices passing the challenge in a permitted client device store and fingerprints of client devices failing one or more challenges in a denied client device store, wherein the passing and failing is based on a threshold.

2. The method of claim 1, wherein the first portion of code is configured to, when executed by the client device, attach to one or more of the canvas events from mouse, keyboard, touch and scrolling events detected within the content and generate the record of detected canvas events, the record of detected canvas events comprising, for each detected canvas event, an event type and at least one of a value associated with the event and a timestamp.

3. The method of claim 1, wherein the second portion of code is configured to, when executed by the client device, provide the record of detected canvas events to the proxy server by setting one or more cookie values in a cookie presented to the proxy server based on the detected canvas events or perform a call to provide the detected canvas events to the proxy server.

4. The method of claim 1, wherein determining whether the record includes detected canvas events indicative of human activity comprising analyzing the record for one or more of a repetition of detected events and a repetition of a sequence of detected event.

5. The method of claim 1, wherein determining whether the record includes detected canvas events indicative of human activity comprises analyzing timestamps associated with detected events in the record for repetition of a difference between timestamps of sequential events.

6. A system for detecting human activity at a client device comprising:
a proxy server comprising a processor and a non-transitory computer readable storage medium storing computer program instructions that when executed by the processor cause the proxy server to:
in response to receipt, by the proxy server, of an initial request for online content of a host server from the client device:
route, by the proxy server, the initial request to the host server,
receive, by the proxy server, a response from the host server, wherein the response includes the requested online content, modify, by the proxy server, the response from the host server to include a client device challenge prior to transmission of the modified response to the client device by the proxy server by:

injecting, by the proxy server, a first portion of code within the requested online content, wherein the first portion of code is configured to monitor, by the proxy server, for canvas events within the client device and create records of detected canvas events in a client device memory, injecting, by the proxy server, a second portion of code, wherein the second portion of code is configured to determine 1) client device attributes by querying for one or more of browser and client device runtime information when executed by the client device and 2) an IP address of the client device, injecting, by the proxy server, in the first and second portions of code, a shared encryption key for encrypting the canvas event record and the client device attributes at the client device, injecting, by the proxy server, a beacon within the requested online content, wherein the beacon includes a 1×1 pixel image and a query string; represented by a beacon request, to retrieve an image of the beacon from the proxy server, wherein the client device attributes and the canvas event record, when the image of the beacon request is retrieved by the client device, are retrieved by the proxy server through the beacon request, wherein the proxy server decrypts the retrieved client device attributes and the canvas event record based on the shared encryption key provided to the client device, and generate, by the proxy server, a fingerprint of the client device based on the client device attributes received from the client device, the record of detected canvas events within the online content by the client device received from the client device, and the IP address of the client device received from the client device;

track, by the proxy server, the received client device attributes received from the client device, the record of detected canvas events within the online content by the client device received from the client device, and the IP address received from the client device via the fingerprint of the client device;

responsive to tracking, by the proxy server, the fingerprint of the client device, determine, by the proxy server, whether the received client device attributes, the received record of detected canvas events within the online content by the client device, and the received IP address from the client device are indicative of human activity;

responsive to determining that the received client device attributes, the received record of detected canvas events within the online content by the client device, and the received IP address from the client device are indicative of human activity, transmit the modified response to the client device;

in response to receipt of the record of detected canvas events within the online content from the client device when the image of the beacon request has been retrieved by the client device:

determine whether the record of detected canvas events includes detected canvas events which are indicative of human activity;

determine whether the record of when the image of the beacon request has been retrieved by the canvas event includes the image of the beacon request being retrieved by the client device which are indicative of human activity; and responsive to a determination that the record of detected canvas events when the image of the beacon request has been retrieved by the client device are indicative of human activity, permit the client device access to the requested online content of the host server, wherein the proxy server maintains fingerprints of client devices passing the challenge in a permitted client device store and fingerprints of client devices failing one or more challenges in a denied client device store, wherein the passing and failing is based on a threshold.

7. The system of claim 6, wherein the first portion of code is configured to, when executed by the client device, attach to one or more of the canvas events from mouse, keyboard, touch and scrolling events detected within the content and generate the record of detected canvas events, the record of detected canvas events comprising, for each detected canvas event, an event type and at least one of a value associated with the event and a timestamp.

8. The system of claim 6, wherein the second portion of code is configured to, when executed by the client device, provide the record of detected canvas events to the proxy server by setting one or more cookie values in a cookie presented to the proxy server based on the detected canvas events or perform a call to provide the detected canvas events to the proxy server.

9. The system of claim 6, wherein determining whether the record includes detected canvas events indicative of human activity comprising analyzing the record for one or more of a repetition of detected events and a repetition of a sequence of detected event.

10. The system of claim 6, wherein determining whether the record includes detected canvas events indicative of human activity comprises analyzing timestamps associated with detected events in the record for repetition of a difference between timestamps of sequential events.

11. A non-transitory computer readable storage medium for detecting human activity at a client device by a proxy server, the computer readable storage medium comprising stored computer program instructions that when executed by a processor cause the processor to:

in response to receipt, by the proxy server, an initial request for online content of a host server from the client device:

route, by the proxy server, the initial request to the host server, receive, by the proxy server, a response from the host server, wherein the response includes the requested online content, modify, by the proxy server, the response from the host server to include a client device challenge prior to transmission of the modified response to the client device by the proxy server by:

injecting, by the proxy server, a first portion of code within the requested online content, wherein the first portion of code is configured to monitor, by the proxy server, for canvas events within the client device and create records of detected canvas events in a client device memory, injecting, by the proxy server, a second portion of code, wherein the second portion of code is configured to determine 1) client device attributes by querying for one or more of browser and client device runtime information when executed by the client device and 2) an IP address of the client device, injecting, by the proxy server, in the first and second portions of code, a shared encryption key for encrypting the canvas event record and the client device attributes at the client device, injecting, by the proxy server, a beacon within the requested online content, wherein the beacon includes a 1×1 pixel image and a query string; represented by a beacon request, to retrieve an image of the beacon from the proxy server, wherein the client device attributes and the canvas event record, when the image of the beacon request is retrieved by the client device, are retrieved by the proxy server through the beacon request, wherein the proxy server decrypts the retrieved client device attributes and the canvas event record based on the shared encryption key provided to the client device, and generate, by the proxy server, a fingerprint of the client device based on the client device attributes received from the client device, the record of detected canvas events within the online content by the client device received from the client device, and the IP address of the client device received from the client device;

track, by the proxy server, the received client device attributes received from the client device, the record of detected canvas events within the online content by the client device received from the client device, and the IP address received from the client device via the fingerprint of the client device;

responsive to tracking, by the proxy server, the fingerprint of the client device, determine, by the proxy server, whether the received client device attributes, the received record of detected canvas events within the online content by the client device, and the received IP address from the client device are indicative of human activity;

responsive to determining that the received client device attributes, the received record of detected canvas events within the online content by the client device, and the received IP address from the client device are indicative of human activity, transmit the modified response to the client device;

in response to receipt of the record of detected canvas events within the online content from the client device when the image of the beacon request has been retrieved by the client device:

determine whether the record of detected canvas events includes detected canvas events which are indicative of human activity;

determine whether the record of when the image of the beacon request has been retrieved by the client device includes the image of the beacon request being retrieved by the client device which is indicative of human activity; and responsive to a determination that the record of detected canvas events when the image of the beacon request has been retrieved by the client device are indicative of human activity, permit the client device access to the requested online content of the host server, wherein the proxy server maintains fingerprints of client devices passing the challenge in a permitted client device store and fingerprints of client devices failing one or more challenges in a denied client device store, wherein the passing and failing is based on a threshold.

12. The non-transitory computer readable storage medium of claim 11, wherein the first portion of code is configured to, when executed by the client device, attach to one or more of the canvas events from mouse, keyboard, touch and scrolling events detected within the content and generate the record of detected canvas events, the record of detected canvas events comprising, for each detected canvas event, an event type and at least one of a value associated with the event and a timestamp.

13. The non-transitory computer readable storage medium of claim 11, wherein the second portion of code is configured to, when executed by the client device, provide the record of detected canvas events to the proxy server by setting one or more cookie values in a cookie presented to the proxy server based on the detected canvas events or perform a call to provide the detected canvas events to the proxy server.

14. The non-transitory computer readable storage medium of claim 11, wherein determining whether the record includes detected canvas events indicative of human activity comprising analyzing the record for one or more of a repetition of detected events and a repetition of a sequence of detected event.

15. The non-transitory computer readable storage medium of claim 11, wherein determining whether the record includes detected canvas events indicative of human activity comprises analyzing timestamps associated with detected events in the record for repetition of a difference between timestamps of sequential events.

* * * * *